United States Patent
Sato

Patent Number: 5,299,758
Date of Patent: Apr. 5, 1994

[54] BAITCASTING REEL HAVING A CLUTCH CONTROL MECHANISM

[75] Inventor: Jun Sato, Sakai, Japan

[73] Assignee: Shimano, Inc., Osaka, Japan

[21] Appl. No.: 941,943

[22] Filed: Sep. 8, 1992

[30] Foreign Application Priority Data

Sep. 17, 1991 [JP] Japan .................................. 3-235827

[51] Int. Cl.⁵ ............................................. A01K 89/02
[52] U.S. Cl. .................................. 242/261; 192/67 R
[58] Field of Search .............. 242/260, 261; 192/67 R

[56] References Cited

U.S. PATENT DOCUMENTS

| | | | |
|---|---|---|---|
| 4,281,808 | 8/1981 | Noda | 242/261 |
| 4,379,530 | 4/1983 | Kobayashi | 242/261 |
| 4,575,024 | 3/1986 | Kaneko | 242/261 |
| 4,666,101 | 5/1987 | Atobe | 242/261 |
| 4,697,760 | 10/1987 | Aoki | 242/261 |
| 4,709,874 | 12/1987 | Murakami | 242/261 |
| 4,798,355 | 1/1989 | Kaneko | 242/261 |
| 4,850,550 | 7/1989 | Aoki | 242/261 |

FOREIGN PATENT DOCUMENTS 62-181169 11/1987 Japan .

Primary Examiner—Clifford D. Crowder
Assistant Examiner—John J. Calvert
Attorney, Agent, or Firm—Dickstein Shapiro & Morin

[57] ABSTRACT

A baitcasting reel has a clutch mechanism mounted in a transmission line between a handle and a spool, a slide type cam plate for operating the clutch mechanism, and a rotary member interlocked to the handle. A return piece is supported by a reel body through a support plate interlocked to the cam plate. The return piece is movable to an interference position inside a locus of revolution of projections formed on the rotary member when the clutch plate is operated to a clutch disengaging position. When the handle is turned in a line winding direction with the clutch mechanism disengaged, the return piece transmits a pressing force from the rotary member to the cam plate through the support plate, whereby the cam plate acts to engage the clutch mechanism. Subsequently, the return piece is pulled by a coil spring outwardly of the locus of revolution of the projections.

10 Claims, 6 Drawing Sheets

BAITCASTING REEL HAVING A CLUTCH CONTROL MECHANISM

BACKGROUND OF THE INVENTION

1. Field of the Invention

This invention relates to baitcasting reels, and more particularly to an improvement in a baitcasting reel having a control mechanism for operating a clutch mechanism mounted in a transmission line between a handle and a spool, a rotary member mounted in a transmission line interlocked to the handle, and a return piece interlocked to the control mechanism to be movable to an interference position inside a locus of revolution of projections formed on the rotary member when the control mechanism is operated to a clutch disengaging position, the return piece being operable to transmit a pressing force from the projections to the control mechanism to engage the clutch mechanism when the handle is turned in a line winding direction.

2. Description of the Related Art

A baitcasting reel having the above construction is disclosed in Japanese Utility Model Publication Kokai No. 1987-181169, for example. In the prior construction, the control mechanism comprises a slide type plate having a return piece pivoted to an end thereof, and the rotary member comprises a ratchet wheel mounted on a handle shaft. During an operation to disengage the clutch mechanism, the return piece is switched to a position inside a locus of revolution of teeth (projections) formed on the ratchet wheel. When the handle is turned in the line winding direction with the clutch mechanism disengaged, the return piece transmits an operating force from the teeth of the ratchet wheel to the plate, thereby to move the plate to a clutch engaging position.

During the operation to disengage the clutch mechanism, the return piece pivotally attached to the plate swings radially of the ratchet wheel into the locus of revolution of the teeth of the ratchet wheel. Consequently, this reel has the advantage of avoiding the inconvenience of the return piece contacting the teeth in the course of an operation to disengage the clutch mechanism.

According to this prior construction, during the operation to disengage the clutch mechanism, the plate is moved in a direction to rotate the ratchet wheel backward, with the return piece erected. This change in the position of the return piece occurring during the operation to disengage the clutch mechanism includes a component of force to displace the return piece axially of the ratchet wheel, and a component of force to move the return piece in the direction to rotate the ratchet wheel backward. If, for example, an end of the return piece contacts a front surface of a tooth (the surface in the direction of forward rotation of the ratchet wheel) in the course of an operation to disengage the clutch mechanism, the clutch mechanism cannot be disengaged because of the component of force acting in the direction of backward rotation.

This phenomenon seldom occurs where the ratchet wheel has a large amount of play. However, this inconvenience is frequently encountered where, as in modem reels, a roller type mechanism allowing little backward play is used for preventing backward turning of the handle. Thus, there is room for improvement.

When the return piece contacts an outer periphery of a tooth of the ratchet wheel during the operation to disengage the clutch mechanism, it is possible to disengage the clutch mechanism by turning the, handle in the line winding direction. However, when the return piece contacts a front surface of a tooth as noted above, the handle cannot be turned in the line winding direction. A suitable improvement in this aspect is desired.

SUMMARY OF THE INVENTION

An object of the present invention is to provide an improved baitcasting reel for allowing the return piece, during an operation to disengage the clutch mechanism, to be set to a position to interfere with the projections of the rotary member reliably, without disabling a handle operation, even where a roller type mechanism allowing little backward play is used for preventing backward turning of the handle.

The above object is fulfilled, according to the present invention, by a baitcasting reel having a control mechanism for operating a clutch mechanism, a rotary member mounted in a transmission line interlocked to a handle, and a return piece interlocked to the control mechanism to transmit a pressing force from projections of the rotary member to the control mechanism to engage the clutch mechanism when the handle is turned in a line winding direction, as noted in the outset hereof, wherein the return piece is supported by a reel body through support means capable of an engaging and disengaging operation by moving axially of the rotary member, and a transporting operation by moving circumferentially of the rotary member. This baitcasting reel further comprises switching means for switching the return piece to the interference position by moving the return piece radially inwardly of the rotary member during an operation to disengage the clutch mechanism, and restoring means operable, when the handle is turned in the line winding direction with the clutch mechanism disengaged, to allow the return piece to move circumferentially of the rotary member under a pressing force imparted from the projections of the rotary member, thereby allowing the control mechanism to operate to the clutch disengaging position, and to cause the return piece to move radially outwardly of the rotary member and remain outside the locus of revolution of the projections of the rotary member.

This construction has the following functions and effects. The above features may be arranged as shown in FIGS. 1 through 4, for example. When disengaging a clutch mechanism C, switching means A switches a return piece 31 to the interference position by moving the return piece 31 radially inwardly of a rotary member 17. Since the return piece 31 is movable radially of the rotary member 17 during this operation, there is little possibility of the return piece 31 contacting projections 17A of the rotary member 17. When a handle 8 is turned in a line winding direction with the return piece 31 lying in the interference position, the return piece 31 moves circumferentially of the rotary member 17 while in contact with the projections 17A of the rotary member 17. As a result, the control mechanism 28 is operated to a clutch engaging position to engage the clutch mechanism C. During this clutch engaging operation, the return piece 31 is retracted outside a locus of revolution of the projections 17A of the rotary member 17 by restoring means 35. Thus, after the clutch mechanism C is engaged, the return piece 31 does not present any obstruction to a handle operation.

Thus, according to the present invention, the return piece 31 is not connected to the control mechanism 28 as in the prior art, but formed separately from the control mechanism 28. Consequently, the return piece 31 is independently operable without being restricted by operation of the control mechanism 28. Even where the projections 17A are formed in a gear-like way peripherally of the rotary member 17, the return piece 31 may be moved radially of the rotary member 17 into the locus of revolution of the projections 17A without contacting front surfaces of the projections 17A (the surfaces in a direction to wind a fishing line of the rotary member). Further, the clutch mechanism C is disengaged without any significant obstruction even if a mechanism allowing little backward play is used to prevent backward turning of the handle 8. When the handle 8 is turned in the line winding direction, the return piece 31 does not obstruct the operation of the control mechanism 28 to engage the clutch mechanism C. After the clutch mechanism C is engaged, the handle 8 may be turned in the line winding direction with no obstacle presented by the return piece 31.

According to the above construction, the return piece 31 may contact outer peripheries of the projections 17A of the rotary member 17 as in the prior art. When this phenomenon takes place, the handle 8 may be turned in the line winding direction as in the prior art, to readily allow the end of the return piece 31 to move into the locus of revolution of the projections 17A.

Thus, the present invention provides an improved baitcasting reel for allowing the return piece, during an operation to disengage the clutch mechanism, to be set to a position to interfere with the projections of the rotary member reliably, without disabling a handle operation, even where a roller type mechanism allowing little backward play is used for preventing backward turning of the handle.

According to the present invention, in particular, the return piece is operable independently of the control mechanism, so that each is smoothly operable without interference of the other. This construction also provides the advantage of minimizing twisting between the return piece and control mechanism.

The foregoing and other objects, features and advantages of the invention will be apparent from the following more particular description of preferred embodiments of the invention, as illustrated in the accompanying drawings.

DETAILED DESCRIPTION OF THE PREFERRED EMBODIMENTS

A baitcasting reel according to the present invention will be described in detail with reference to the drawings.

Figure 3:
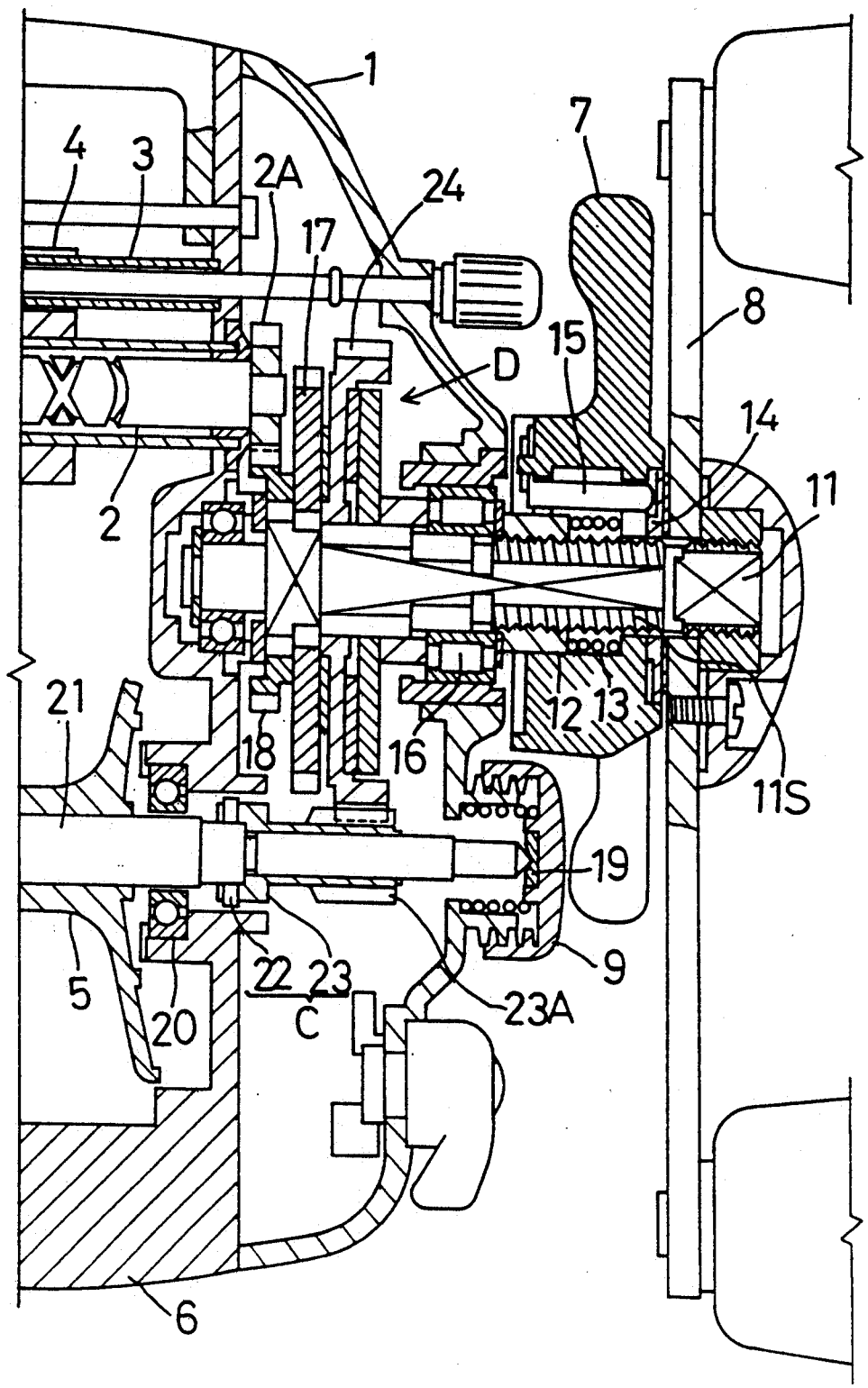
FIG. 3 is a sectional view of a right half of the baitcasting reel.
Figure 4:
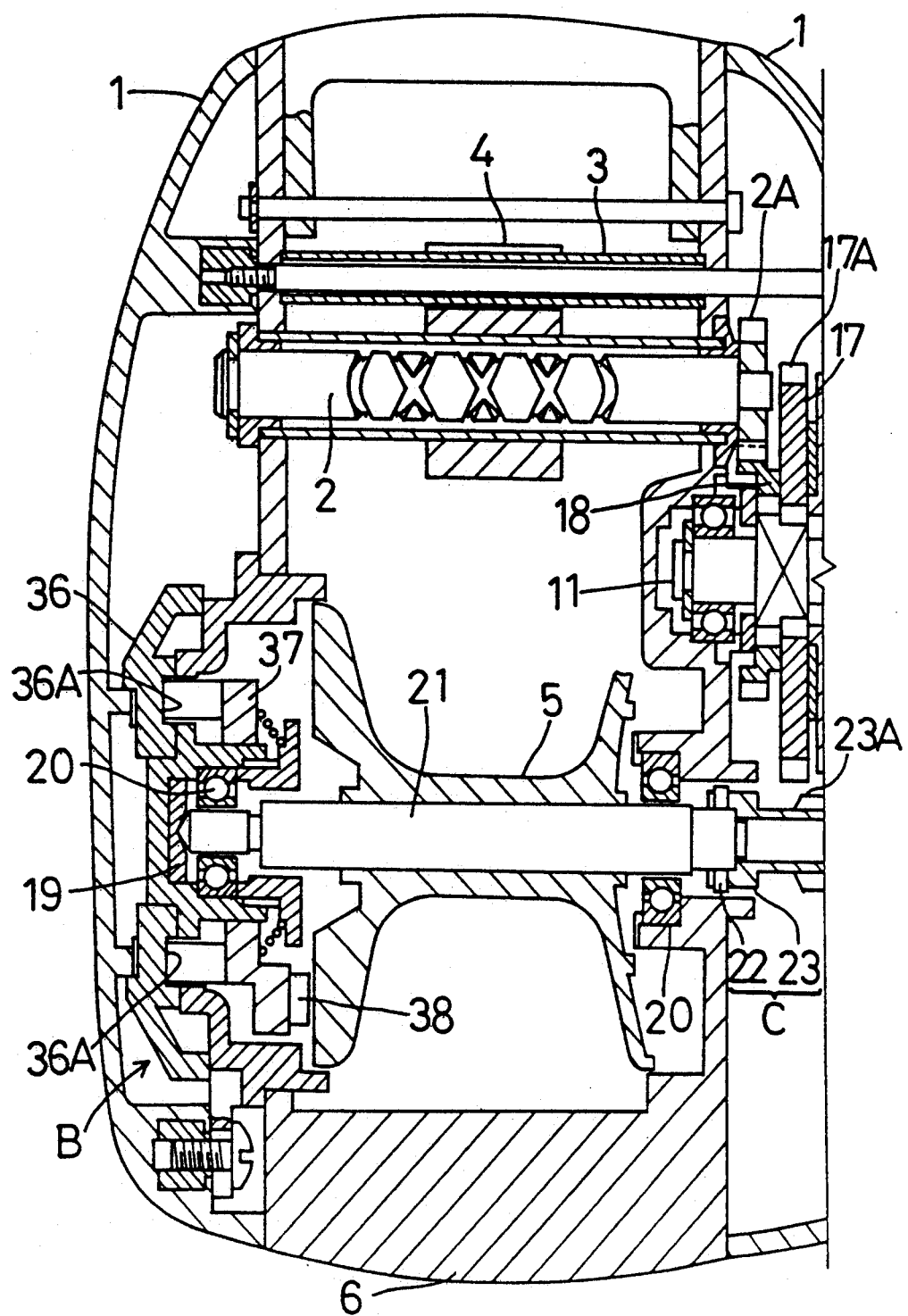
FIG. 4 is a sectional view of a left half of the baitcasting reel.

As shown in FIGS. 3 and 4, the baitcasting reel comprises right and left side cases 1 constituting a reel body, and a level wind mechanism mounted between the t,%,o side cases 1. The level wind mechanism includes a screw shaft 2, and a line guide 4 reciprocable right and left along a guide rod 3 with rotation of the screw shaft 2. Further, the reel body has a spool 5 for winding a fishing line (not shown), and a thumb rest 6. The right side case 1 supports a drag controller 7, a handle 8, a cast controller 9, all disposed outwardly of the right side case 1. The left side case 1 contains a brake mechanism B.

The right side case 1 rotatably supports a handle shaft 1 1 connected to the handle 8. The drag controller 7 is mounted on a nut 12 meshed with a screw portion 11S of the handle shaft 11. A spring 13 is mounted between the nut 12 and drag controller 7. Between the handle shaft 11 and the screw portion 11S thereof are a sound producing disk 14 defining a plurality of recesses, and a sound producing piece 15 for engaging the recesses. When the drag controller 7 is turned, a pressing force is transmitted from the drag controller 7 to a drag mechanism D through a roller type one-way clutch 16, with an end of the sound producing piece 15 flipping on the sound producing disk 14 to produce a clicking sound.

The handle shaft 11 supports the drag mechanism D, a rotary member 17 defining a plurality of gear-like projections 17A, and a transmission gear 18. The one-way clutch 16 prevents backward turning of the handle 8. The transmission gear 18 is meshed with an input gear 2A mounted on the screw shaft 2 for driving the level wind mechanism.

The spool 5 is rotatable with a spool shaft 21 supported by ceramic plates 19 disposed at opposite ends thereof, and by ball bearings 20. The spool shaft 21 has an engaging pin 22 attached to an intermediate position thereof, and a clutch sleeve 23 slidably mounted thereon to be engageable with the pin 22. The clutch sleeve 23 has an input gear 23A meshed with an output gear 24 of the drag mechanism D.

The engaging pin 22 and clutch sleeve 23 constitute a clutch mechanism C. When the handle 8 is turned with the clutch sleeve 23 engaged with the pin 22, the spool 5 is rotated to wind the fishing line thereon. A small gap is formed between the spool shaft 21 and an inner race of each ball bearing 20. The spool shaft 21 has pointed ends engaged with recesses of the ceramic plates 19. Thus, the spool shaft 21 is supported through reduced contact areas to be rotatable with improved smoothness, thereby to increase a casting distance. The cast controller 9 includes a screw portion 9A having a trapezoidal thread for improved strength.

Figure 1:
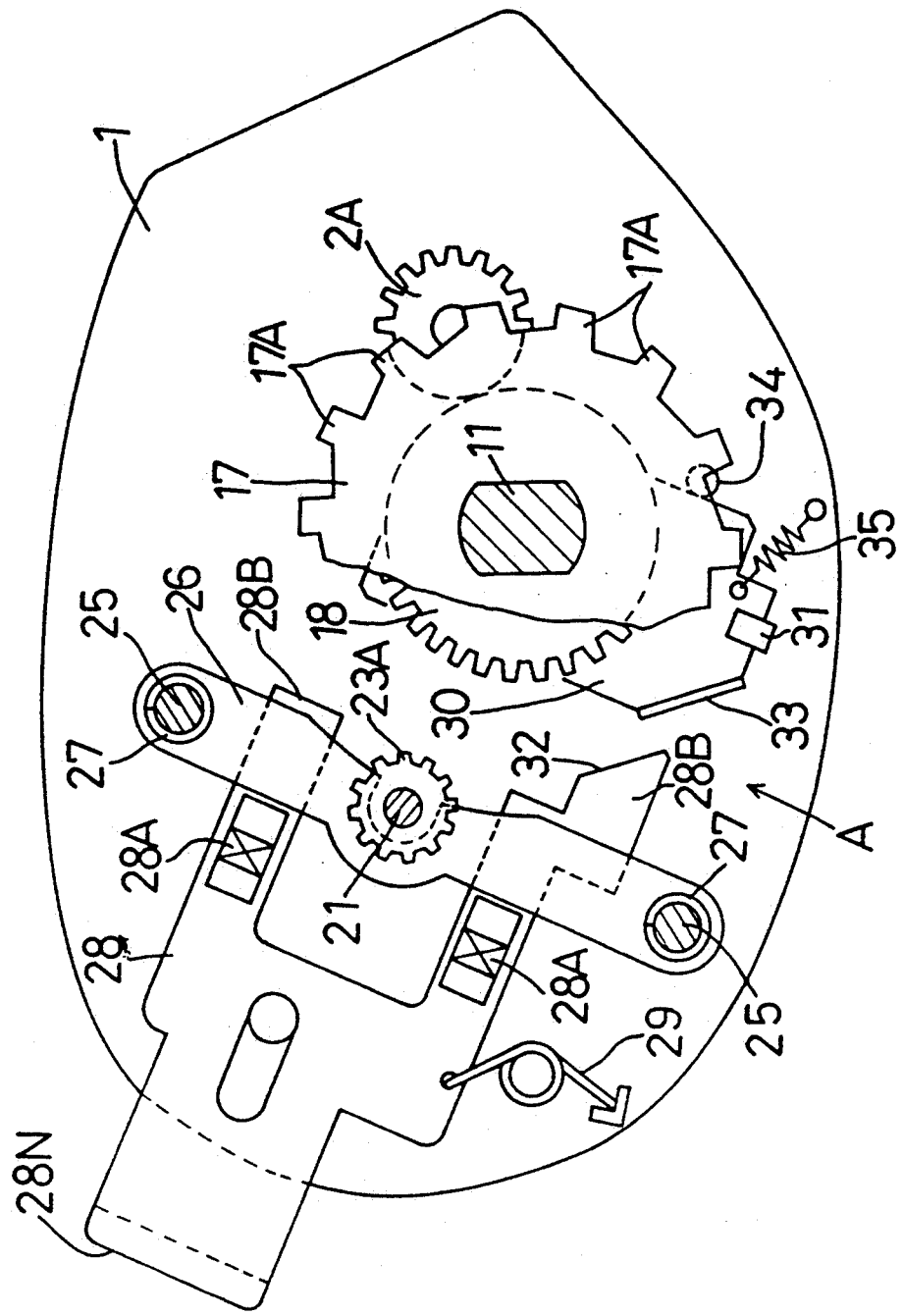
FIG. 1 is a side view of a clutch control system of a baitcasting reel according to the present invention.
Figure 2:
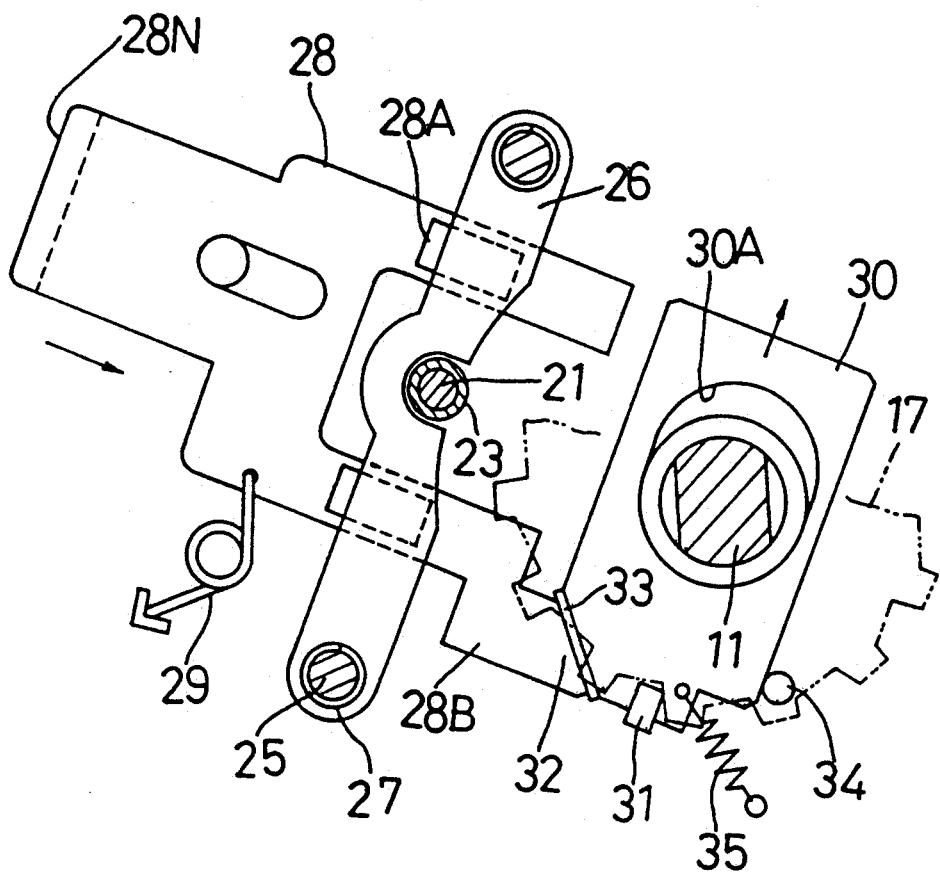
FIG. 2 is a side view of the clutch control system in a declutching state.

As shown in FIGS. 1 and 2, the clutch sleeve 23 is engaged with a yoke 26 slidably supported on a pair of support shafts 25. Coil springs 27 are mounted on the support shafts 25 to operate the yoke 26 to a clutch engaging position.

A slide type cam plate 28 (one example of control mechanisms) is retainable by a toggle spring 29 in a position to engage the clutch mechanism C and a position to disengage the clutch mechanism C. The cam plate 28 has a pair of cam surfaces 28A for contacting the yoke 26 and operating the yoke 26 to a declutching position. The cam plate 28 also has a pair of fork legs 28B.

Referring to FIG. 2, a plate 30 (one example of support means) is supported to be rotatable and slidable relative to the right side case 1. The plate 30 defines a slot 30A for receiving the handle shaft 11, and a return piece 31 formed at an end of the plate 30. The plate 30 defines a cam surface 33 for contacting an inclined surface 32 formed at an end of one of the fork legs 28B, to move the plate 30 radially inwardly of the rotary member 17. The plate 30 is movable toward the rotary member 17 under guiding action of a guide pin 34 projecting from the right side case 1. Further, a coil spring 35 is provided between the plate 30 and right side case 1 to pull the return piece 31 outside a locus of revolution of the projections 17A of the rotary member 17.

The inclined surface 32 at the end of one fork arm 28B, the cam surface 33 of the plate 30, and the guide pin 34 constitute a switching device A. The coil spring 35 acts as a restoring device.

When a knob 28N of the cam plate 28 is pressed, the clutch mechanism C is disengaged by contact between the cam surfaces 28A of the cam plate 28 and the yoke 26. At the same time, the inclined surface 32 contacts the cam surface 33 of the plate 30, whereby the return piece 31 moves radially of the rotary member 17 into the locus of revolution of the projections 17A. When, in this state, the handle 8 is turned in a line winding direction, the plate 30 is rotated with the return piece 31 contacting the projections 17A of the rotary member 17. As a result, the cam plate 28 is operated to a clutch engaging position. Then the clutch mechanism C is engaged under the biasing force of coil springs 27 mounted on the support shafts 25. Since the cam plate 28 is separated from the plate 30, the return piece 31 is retracted outside the locus of revolution of the projections 17A of the rotary member 17 under the biasing force of the coil spring 35 acting on the plate 30.

As shown in FIG. 4, the brake mechanism B includes a dial 36 defining cam grooves 36A, and a frame 37 engaged with the grooves 36A and carrying a magnet 38. The frame 37 is movable along the spool shaft 21 by turning the dial 36. The resulting variation in the distance between the magnet 38 and a side surface of the spool 5 formed of a metal changes the value of an eddy current generated on the spool 5, thereby to adjust a braking force applied to the spool 5.

Figure 5:
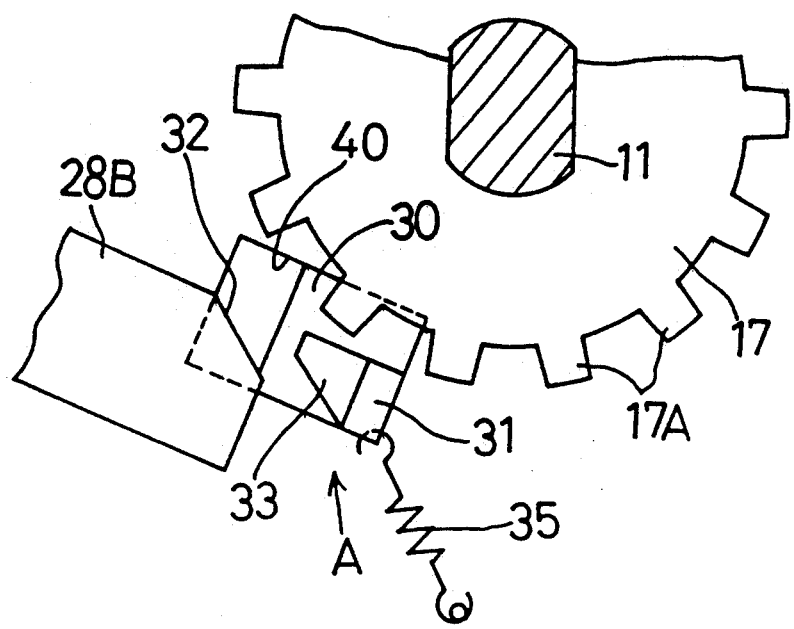
FIG. 5 is a side view of a switching device in a different embodiment (a)
Figure 6:
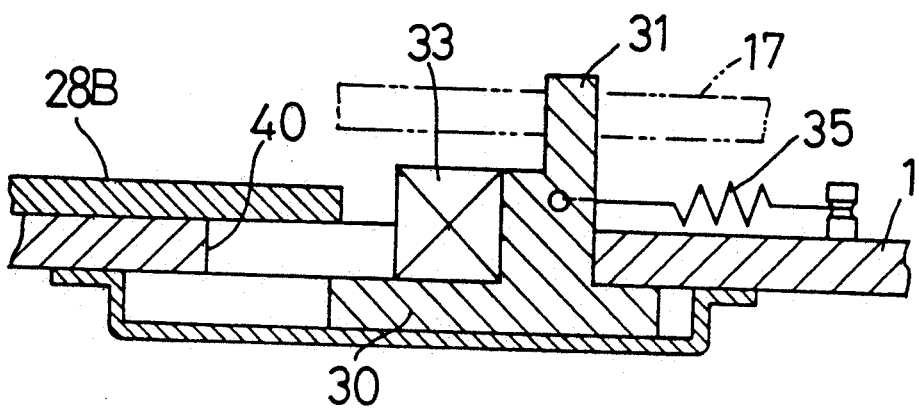
FIG. 6 is a sectional view of the switching device in the different embodiment (a)

The foregoing embodiment may be modified as follows:

(a) As shown in FIGS. 5 and 6, the reel body I defines a rectangular opening 40, and a plate 30 movable along edges of the opening 40 has a return piece 3 1. A coil spring 35 acts on the return piece 3 1. During an operation to disengage the clutch mechanism C, the return piece 31 is moved radially of the rotary member 17 into the locus of revolution of the projections 17A as in the foregoing embodiment. When the handle 8 is turned in the line winding direction, the return piece 31 moves the cam plate 28 to the clutch engaging position, and is at the same time restored by the biasing force of the coil spring 35.

Figure 7:
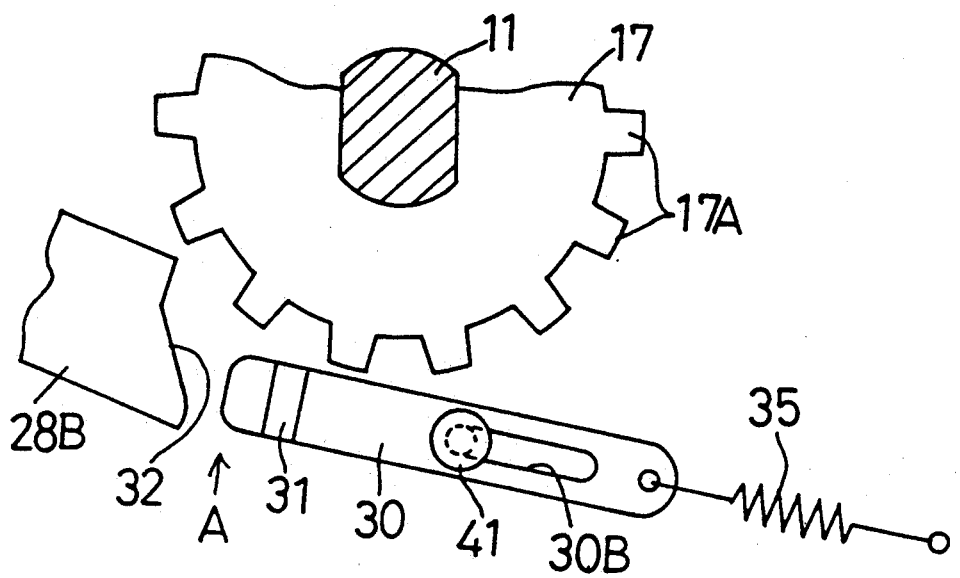
FIG. 7 is a side view of a switching device in a different embodiment (b)
Figure 8:
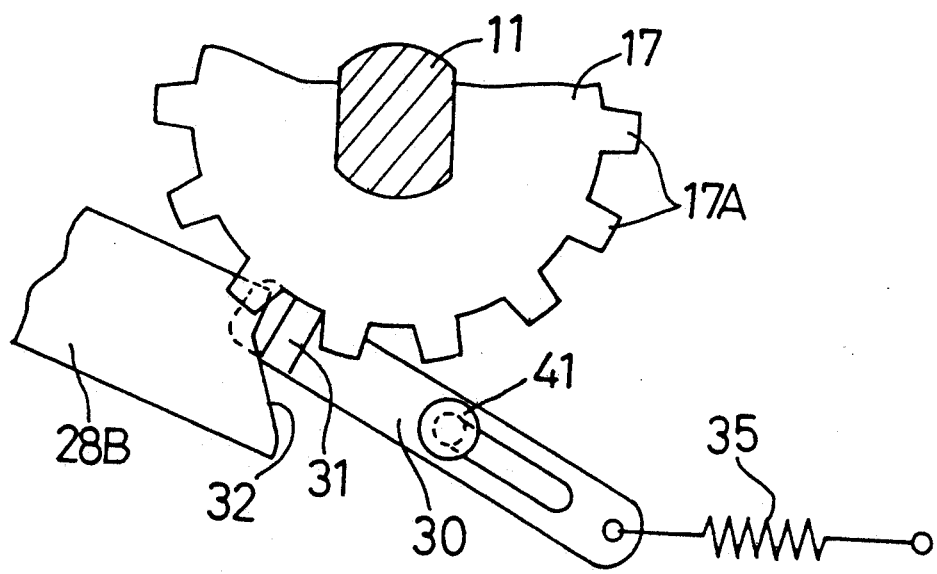
FIG. 8 is a side view of the switching device in a declutching state in the different embodiment.

(b) As shown in FIGS. 7 and 8, a return piece 31 is formed on a plate 30 defining a slot 30B through which the plate 30 is oscillatably and slidably supported on a pin 41 formed on the reel body 1. A return spring acts on the plate 30. When the cam plate 28 is operated to disengage the clutch mechanism C, the plate 30 swings about the pin 41 to move the return piece 31 radially of the rotary member 17 into the locus of revolution of the projections 17A. When the handle 8 is turned in the line winding direction, the plate 30 is caused to slide along the slot 30B by contact between the projections 17A of the rotary member 17 and the return piece 31, thereby allowing the clutch mechanism C to be engaged. After the clutch mechanism C is engaged, the cam plate 28 and plate 30 are separated from each other, and the plate 30 is restored by the biasing force of the return spring 35.

(c) The control mechanism may comprise a cam rotatable about the spool shaft to operate a yoke. Further, a ratchet wheel may- be used as the rotary member.

What is claimed is:

1. A baitcasting reel comprising:
   a reel body;
   a clutch mechanism mounted in a transmission line between a handle and a spool;
   a rotary member mounted in a transmission line interlocked to said handle, said rotary member including projections;
   support means movable radially and circumferentially of said rotary member;
   a return piece provided on said support means and capable of effecting an engaging/disengaging operation by moving radially of said rotary member and a transporting operation by moving circumferentially of said rotary member;
   a clutch control mechanism supported by said reel body, said control mechanism having an inclined surface;
   switching means including said inclined surface and a guide member formed on said reel body for guiding said support means; and
   restoring means interposed between said reel body and said support means;
   said baitcasting reel being arranged such that when said control mechanism is moved to a clutch disengaging position, said inclined surface and said support means are placed in contact with each other and said return piece is caused to move radially of said rotary member to enter a locus of revolution of said projections to reach an interference condition, and then when said handle is turned in a line winding direction, said projections press against said return piece such that said return piece actuates said control mechanism to engage said clutch mechanism, and then said return piece is moved radially out of said locus of revolution of said projections.

2. A baitcasting reel as claimed in claim 1, wherein said control mechanism comprises a slide type cam plate.

3. A baitcasting reel as claimed in claim 2, wherein said clutch mechanism includes an engaging pin attached to an intermediate position of a shaft of said spool, and a clutch sleeve slidably mounted on said shaft to be engageable with said engaging pin.

4. A baitcasting reel as claimed in claim 3, wherein said inclined surface is formed at an end of a fork of said control mechanism, said guide member being a guide pin, said support means being a plate-like member having a cam surface, said inclined surface and said cam surface coming into contact with each other when said control mechanism is moved to said clutch disengaging position.

5. A baitcasting reel as claimed in claim 1, wherein said restoring means comprises a coil spring.

6. A baitcasting reel as claimed in claim 1, wherein said return piece is formed on said support means movable along an edge of a rectangular opening defined in said reel body, said restoring means being operable to apply a biasing force to said return piece, whereby during an operation to disengage said clutch mechanism said return piece is moved radially of said rotary member into said locus of revolution of said projections.

7. A baitcasting reel as claimed in claim 6, wherein said restoring means comprises a coil spring.

8. A baitcasting reel as claimed in claim 1, wherein said support means includes a slot through which said support means is oscillatably and slidably supported on a pin formed on said reel body, said restoring means being operable to apply a biasing force to said support means, whereby during an operation to disengage said clutch mechanism said support means swings about said pin to move said return piece radially of said rotary member into said locus of revolution of said projections.

9. A baitcasting reel as claimed in claim 8, wherein said restoring means comprises a coil spring.

10. A baitcasting reel comprising:
 a clutch mechanism mounted in a transmission line between a handle and a spool;
 a control mechanism for operating said clutch mechanism; a rotary member mounted in a transmission line interlocked to said handle; and
 a return piece actuated by said control mechanism, wherein said return piece is supported by a reel body through support means movable radially of said rotary member for engaging and disengaging contact of said return piece with said rotary member, and a transporting operation by moving circumferentially of said rotary member, such that said return piece is movable to an interference position inside a locus of revolution of projections formed on said rotary member when said control mechanism is operated to a clutch disengaging position, and operable to transmit a pressing force from said projections to said control mechanism to engage said clutch mechanism when said handle is turned in a line winding direction;
said baitcasting reel further comprising:
switching means for switching said return piece to said interference position by moving said return piece radially inwardly of said rotary member during an operation to disengage said clutch mechanism; and
restoring means operable, when said handle is turned in said line winding direction with said clutch mechanism disengaged, to allow said return piece to move circumferentially of said rotary member under a pressing force imparted from said projections of said rotary member, thereby allowing said control mechanism to operate to said clutch disengaging position, and to cause said return piece to move radially outwardly of said rotary member and remain outside said locus of revolution of said projections of said rotary member; and
wherein said control mechanism comprises a slide type cam plate; and
wherein said clutch mechanism includes an engaging pin attached to an intermediate position of a shaft of said spool, and a clutch sleeve slidably mounted on said shaft to be engageable with said engaging pin; and
wherein said switching means includes an inclined surface formed at an end of a fork of said control mechanism, a cam surface of said support means in plate form, and a guide pin formed on said reel body for guiding said support means.

* * * * *